(12) United States Patent
Cheng et al.

(10) Patent No.: US 7,929,622 B2
(45) Date of Patent: Apr. 19, 2011

(54) METHOD OF CHANNEL ESTIMATION

(75) Inventors: Shin-Shiuan Cheng, Fonghua Village (TW); Ju-Chun Wu, Fonghua Village (TW)

(73) Assignee: Himax Technologies Limited, Tainan County (TW)

(*) Notice: Subject to any disclaimer, the term of this patent is extended or adjusted under 35 U.S.C. 154(b) by 724 days.

(21) Appl. No.: 11/700,826

(22) Filed: Feb. 1, 2007

(65) Prior Publication Data

US 2007/0183521 A1    Aug. 9, 2007

(30) Foreign Application Priority Data

Feb. 9, 2006 (TW) .............................. 95104406 A

(51) Int. Cl.
*H04K 1/10* (2006.01)
(52) U.S. Cl. ........................ 375/260; 375/316
(58) Field of Classification Search .................. 375/260, 375/267, 299, 140–141, 316
See application file for complete search history.

(56) References Cited

U.S. PATENT DOCUMENTS

| 5,809,083 A * | 9/1998 | Wright ........................ 375/285 |
| 6,442,129 B1 | 8/2002 | Yonge, III et al. |
| 6,519,300 B1 * | 2/2003 | Ramesh ........................ 375/344 |
| 7,660,229 B2 * | 2/2010 | Papasakellariou et al. ... 370/203 |
| 7,664,193 B2 * | 2/2010 | Jalali et al. ..................... 375/267 |
| 2008/0108310 A1 * | 5/2008 | Tong et al. ...................... 455/69 |
| 2008/0253469 A1 * | 10/2008 | Ma et al. ........................ 375/260 |
| 2008/0279259 A1 * | 11/2008 | Kobayashi et al. ........... 375/135 |
| 2009/0225891 A1 * | 9/2009 | Ma et al. ........................ 375/267 |

FOREIGN PATENT DOCUMENTS

| CN | 1437338 A | 8/2003 |
| TW | I241810 | 10/2005 |

OTHER PUBLICATIONS

Mingqi, Li et al., "A Channel Estimation Method Based on Frequency-domain Pilots and Time-domain Processing OFDM Systems", Inst. of Image Comm. & Info. Processing, Shanghai Jiaolong Univ., Shanghai 200030, vol. 14, Issue 11, Nov. 30, 2004, pp. 5-9.

* cited by examiner

*Primary Examiner* — Emmanuel Bayard
(74) *Attorney, Agent, or Firm* — Rabin & Berdo, P.C.

(57) ABSTRACT

A method of channel estimation is provided. The method is applied to a communication system having signals transmitted via a plurality of pilot and non-pilot sub-channels. The method comprises the steps of obtaining a first and second channel responses of each pilot sub-channel using pilot symbols received during a first and second time duration respectively, obtaining an estimated channel response of each pilot sub-channel by averaging the first and second channel responses thereof, and obtaining an estimated channel response of each non-pilot sub-channel by interpolation of those of the pilot sub-channels.

6 Claims, 3 Drawing Sheets

METHOD OF CHANNEL ESTIMATION

This application claims the benefit of Taiwan application Serial No. 95104406, filed Feb. 9, 2006, the subject matter of which is incorporated herein by reference.

BACKGROUND OF THE INVENTION

1. Field of the Invention

The invention relates in general to a method of channel estimation, and more particularly to a method of channel estimation which requires a small amount of memory and resources.

2. Description of the Related Art

The orthogonal frequency division multiplexing (OFDM) system having an advantage of preventing multi-path interference resulting in the ghost image is adopted by DVB-T (Digital Video Broadcast Terrestrial) for a high image quality.

In the OFDM system, multi-carrier modulation is performed at the transmitter side and the data are transmitted on sub-carriers through a number of sub-channels. The sub-carriers have different frequencies and are orthogonal to each other such that the data are transmitted at a lower rate in each sub-channel. The characteristics of the transmission channels are time and frequency-dependent. Therefore, the channel response of each sub-channel should be estimated at the receiver side for compensation of the received signals.

Generally speaking, a signal $Y_{ki}$ received via a $k^{th}$ sub-channel at time slot ti can be denoted by:

$$Y_{ki} = H_{ki} \cdot X_{ki} + N_{ki} \quad (1)$$

Wherein $X_{ki}$ is the signal transmitted via the $k^{th}$ sub-channel at the time slot ti, $H_{ki}$ is the channel response of the $k^{th}$ sub-channel at the time slot ti, and $N_{ki}$ is the noise of the $k^{th}$ sub-channel at the time slot ti.

The channel response $H_{ki}$ could be derived by pilot-based channel estimation. FIG. 1 shows a pilot pattern of the OFDM system. Each circle denotes data transmitted by a sub-channel $C(0), C(1), \ldots,$ or $C(n)$ at a time slot $t0, t1, \ldots,$ or tn. Each of the OFDM symbols $S(t0), S(t1), \ldots,$ and $S(tn)$ including a number of signals modulated in one of the sub-channels $C(0), C(1), \ldots,$ and $C(n)$ is received at each of the time slots $t0, t1, \ldots,$ and tn. The black circle denotes a pilot symbol, and the content and allocation thereof are already known at the receiver side. Therefore, the channel response of each sub-channel could be estimated using the received pilot symbols.

In the estimation of channel response, the influence of noise $N_{ki}$ could be ignored and the estimated channel response could be derived by:

$$\hat{H}_{ki} = Y_{ki}/X_{ki} \quad (2)$$

Once the channel responses for the pilot symbols are derived, those for the data symbols could be estimated by linear interpolation. The linear interpolation includes a time-domain interpolation and frequency-domain interpolation. FIG. 2 is a flowchart of a method for estimation of the channel response $H_{12}$ of a sub-channel $C(1)$ at a time slot t2. The channel response $H_{ki}$ is denoted by $A_{ki}*\exp(j\theta_{ki})$, wherein A is the amplitude and $\theta$ is the phase. In step 201, the amplitude and phase of the response $H_{32}$ is obtained. Since the ratio of the interval between the time slots t2 and t1 to that between the time slots t2 and t5 is 1:3 and the linear interpolation is adopted, the amplitude $A_{32}$ at the time slot t2 is denoted by:

$$A_{32} = (A_{31}*\tfrac{3}{4} + A_{35}*\tfrac{1}{4})$$

The phase $\theta_{32}$ is denoted by:

$$\theta_{32} = (\theta_{31}*\tfrac{3}{4} + \theta_{35}*\tfrac{1}{4})$$

In step 203, the amplitude and phase of the response $H_{12}$ is obtained. Since the ratio of difference between the frequencies of the sub-carriers on the sub-channels $C(1)$ and $C(0)$ to that between the frequencies of the sub-carriers on the sub-channels $C(1)$ and $C(3)$ is 1:2, and a linear interpolation is adopted, the amplitude response of the sub-channel $C(1)$ at the time slot t2 is denoted by:

$$A_{12} = (A_{02}*\tfrac{2}{3} + A_{32}*\tfrac{1}{3})$$

The phase response is denoted by:

$$\theta_{12} = (\theta_{02}*\tfrac{2}{3} + \theta_{32}*\tfrac{1}{3})$$

However, in the previously described channel estimation, it is necessary to estimate the channel response of each sub-channel in each time slot at the receiver side, which requires a lot of resources. Besides, a large memory is required for storage of each estimated channel response, which increases the cost.

SUMMARY OF THE INVENTION

The invention is directed to a method of channel estimation which requires a small amount of memory and resources.

According to the present invention, a method of channel estimation is provided. The method is applied to a communication system having signals transmitted via a plurality of pilot and non-pilot sub-channels. The method comprising the steps of obtaining a first and second channel responses of each pilot sub-channel using pilot symbols received during a first and second time duration respectively, obtaining an estimated channel response of each pilot sub-channel by averaging the first and second channel responses thereof, and obtaining an estimated channel response of each non-pilot sub-channel by interpolation of those of the pilot sub-channels.

The invention will become apparent from the following detailed description of the preferred but non-limiting embodiments. The following description is made with reference to the accompanying drawings.

DETAILED DESCRIPTION OF THE INVENTION

A traditional wireless receiver, such as a digital television receiver, has to timely estimate a channel response of the transmission channel due to its time-dependent variation, which thereby requires lots of resources and memory. However, in terms of a home use digital television receiver, the time-dependent variation of channel response is too small to be significant since the location of the TV set is fixed. By this feature, a method of channel estimation for a stationary wireless receiver is provided. The channel response is estimated only when some events occur, such as power on or degradation of signal quality. Only a small amount of resources and memory is required since the operation of channel estimation is simplified.

Figure 1:
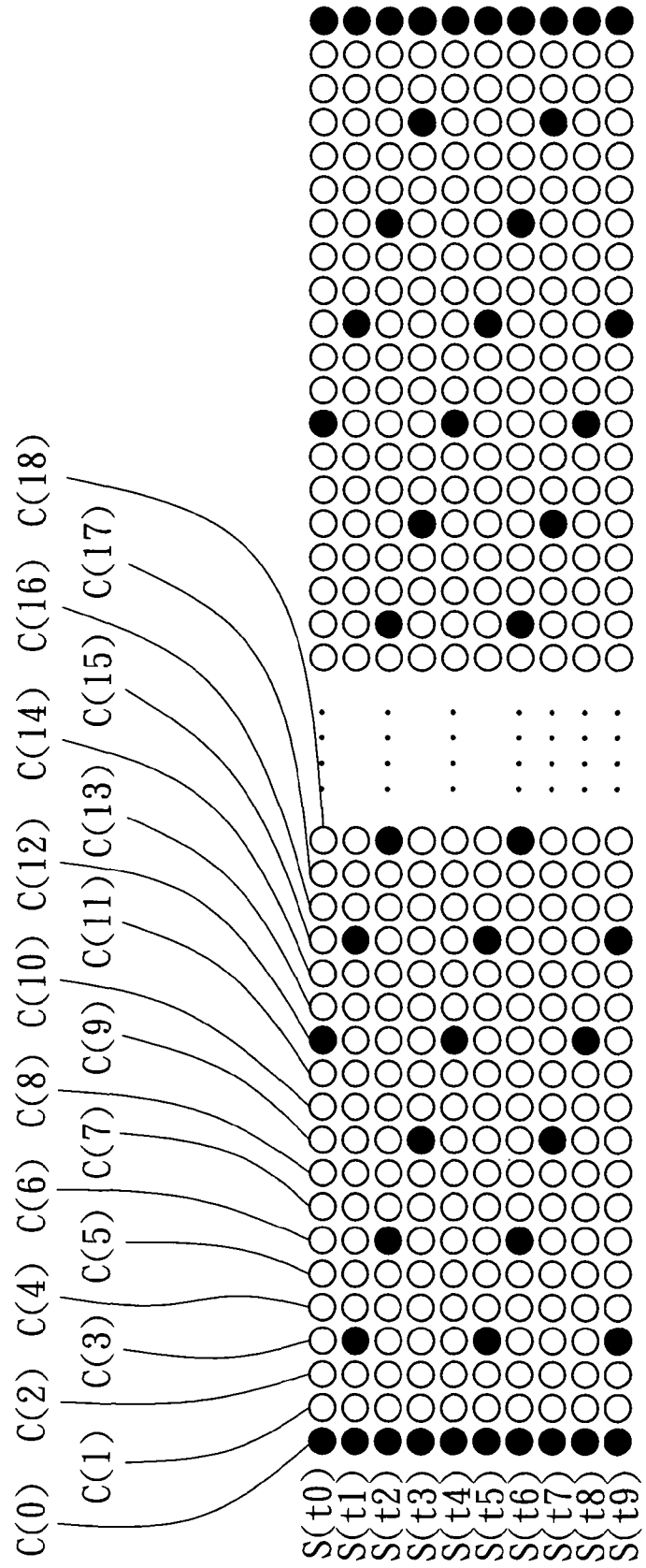
FIG. 1 is a pilot pattern of an OFDM system.
Figure 2:
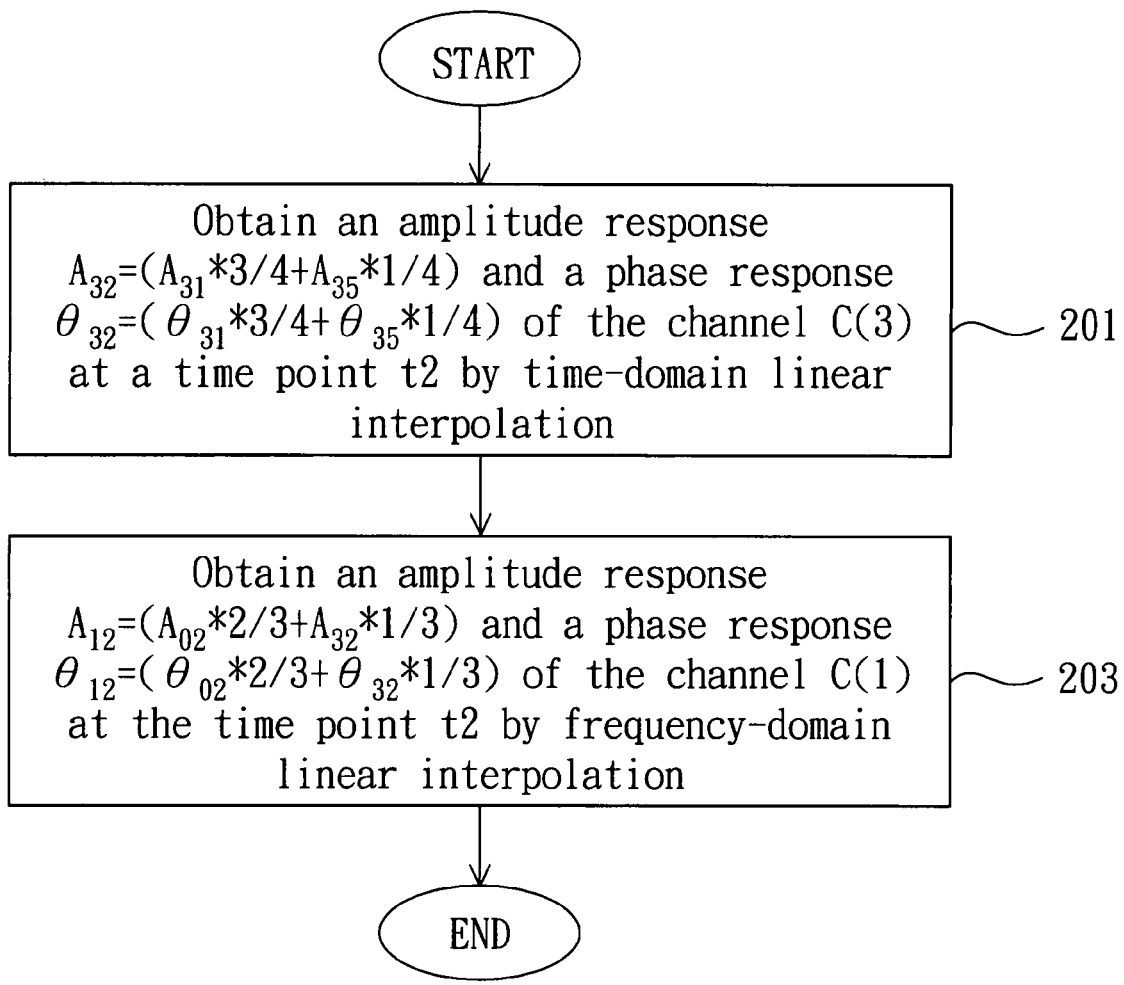
FIG. 2 is a flowchart of conventional channel estimation.
Figure 3:
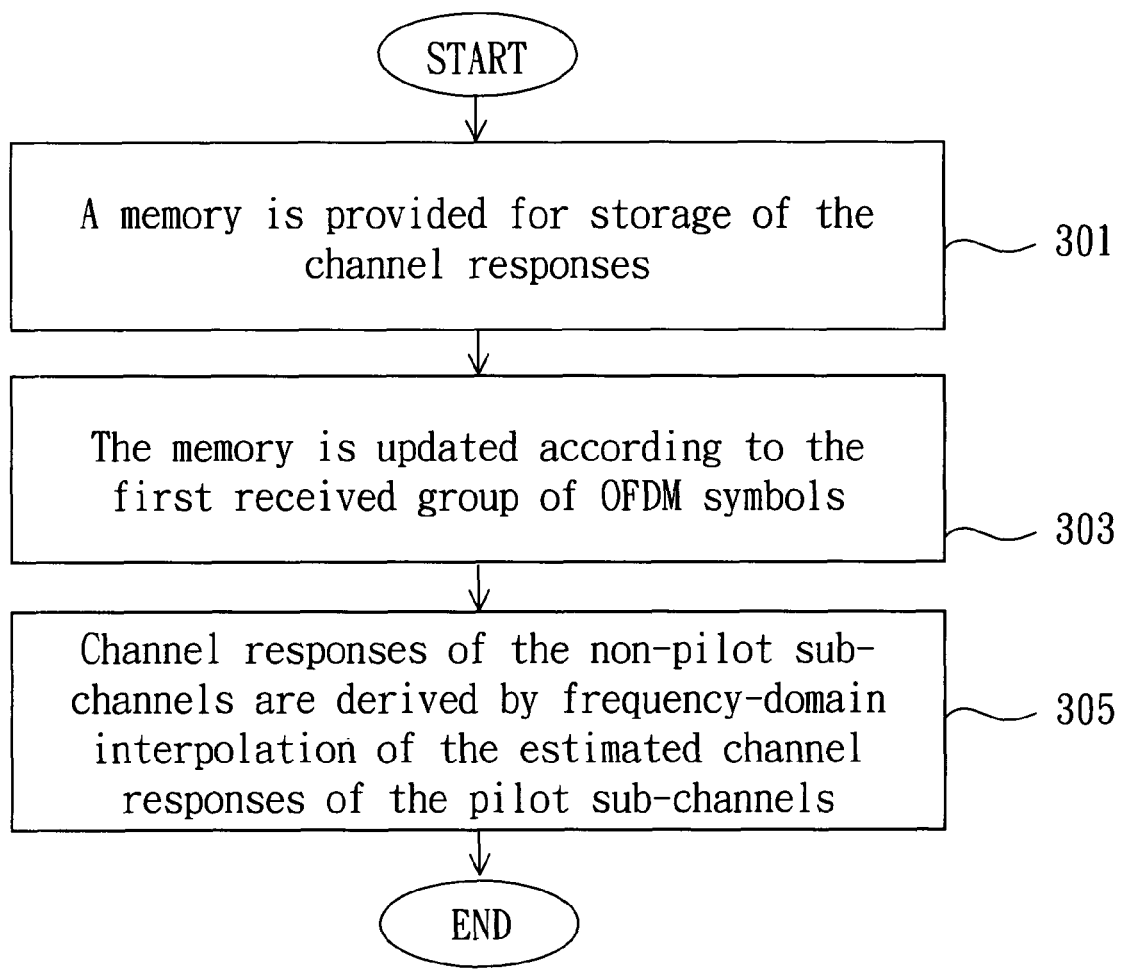
FIG. 3 is a flowchart of channel estimation according to a preferred embodiment of the invention.

FIG. 3 is a flowchart of channel estimation according to a preferred embodiment of the invention. The pilot pattern used in the embodiment is the same as that in FIG. 1. Every four OFDM symbols, such as $S(t0) \sim S(t3)$, are arranged into a group. The pilot symbols are the same. However the invention is not limited to an OFDM system having four symbols grouped.

In step 301, a memory is provided for storage of the channel responses. The memory has blocks each of which stores the channel response of one of the sub-channels and has a size the same as that of one OFDM symbol. All the blocks initially store a value of 1.

In step 303, the memory is updated according to the first received group of OFDM symbols. More specifically, the OFDM symbol received at time t0 is decoded for estimation of the channel responses of the pilot sub-channels C(0) and C(12) (carrying the pilot symbols). The $0^{th}$ and $12^{th}$ blocks of the memory are updated by replacing the previously stored values (1 and 1) with the newly estimated channel responses $\hat{H}_{00}$ and $\hat{H}_{12\ 0}$ respectively. The OFDM symbols received at time t1 are decoded for estimation of the channel responses of the pilot sub-channels C(0), C(3) and C(15). The $0^{th}$, $3^{rd}$ and $15^{th}$ blocks of the memory are updated by replacing the stored values ($\hat{H}_{00}$, 1 and 1) with the newly estimated channel responses $\hat{H}_{01}$, $\hat{H}_{31}$, and $\hat{H}_{15\ 1}$ respectively. The OFDM symbol received at time t2 is decoded for estimation of the channel responses of the pilot sub-channels C(0), C(6) and C(18). The $0^{th}$, $6^{th}$ and $18^{th}$ blocks of the memory are updated by replacing the previously stored values ($\hat{H}_{01}$, 1 and 1) with the newly estimated channel responses $\hat{H}_{02}$, $\hat{H}_{62}$ and $\hat{H}_{18\ 2}$ respectively. The OFDM symbol received at time t3 is decoded for estimation of the channel responses of the pilot sub-channels C(0) and C(9). The $0^{th}$ and $9^{th}$ blocks of the memory are updated by replacing the previously stored values ($\hat{H}_{02}$ and 1) with the newly estimated channel responses $\hat{H}_{03}$ and $\hat{H}_{93}$ respectively. The values stored in the blocks for the other non-pilot sub-channels (through which no pilot symbol is transmitted) remain unchanged (the initial value of 1).

In step 303, the memory is updated according to the second received group of OFDM symbols. More specifically, the OFDM symbol received at time t4 is decoded for estimation of the channel responses of the pilot sub-channels C(0) and C(12). The $0^{th}$ and $12^{th}$ blocks of the memory are updated by replacing the previously stored values ($\hat{H}_{03}$ and $\hat{H}_{12\ 0}$) with the average of $\hat{H}_{03}$ and $\hat{H}_{04}$, and the average of $\hat{H}_{12\ 0}$ and $\hat{H}_{12\ 4}$ respectively. The OFDM symbol received at time t5 is decoded for estimation of the channel responses of the pilot sub-channels C(0), C(3) and C(15). The $0^{th}$, $3^{rd}$ and $15^{th}$ blocks of the memory are updated by replacing the previously stored values with the average of ½($\hat{H}_{03}+\hat{H}_{04}$) and $\hat{H}_{05}$, the average of $\hat{H}_{31}$ and $\hat{H}_{35}$, and the average of $\hat{H}_{15\ 1}$ and $\hat{H}_{15\ 5}$ respectively. The operations for time t6 and t7 are similar to those for time t4 and t5.

In step 305, channel responses of the non-pilot sub-channels are derived by frequency-domain interpolation of the estimated channel responses of the pilot sub-channels. The blocks corresponding to the non-pilot sub-channels are updated by replacing the initial values with the newly derived channel responses.

Finally, frequency equalization is performed on the received signal $Y_{ki}$ using the channel responses obtained by the previously described steps.

Although only the first two received groups of OFDM symbols are included in the previously described embodiment, the present invention are not limited thereto and three or more groups may be included. The more groups are included for the estimation, the less the noise influences the result. Referring to the equations (1) and (2), the difference between the channel response estimated using the pilot symbols and the actual channel response is denoted by:

$$\Delta H = H_{ki} - \hat{H}_{ki} = N_{ki}/X_{ki} \qquad (3)$$

The noise N can be considered to be Gaussian noise with an average value equal to 0. Thus, the value of $\Sigma \Delta H$ converges to 0 as the number of times the step 303 is repeated increases.

In the previously described embodiment, only the time-independent channel responses of different sub-channels are stored due to insignificance of time-dependent variation of the channels. Thus, the operation of estimation is simplified and only a small amount of memory and resources are required.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of channel estimation applied to a communication system having signals transmitted via a plurality of pilot and non-pilot sub-channels, the method comprising:
respectively receiving pilot symbols by a receiver of the communication system from a first time duration to a second time duration and accordingly obtaining a first channel response and a second channel response for each of a first portion of the pilot sub-channels during the first time duration and the second time duration and obtaining at least three channel responses for each of a second portion of the pilot sub-channels from the first time duration to the second time duration, wherein the first time duration is not consecutive to the second time duration;
averaging the first and the second channel responses of each of the first portion of the pilot sub-channels by the communication system to obtain an estimated channel response of each of the first portion of the pilot sub-channels;
averaging a last two channel responses of the at least three channel responses of each of the second portion of the pilot sub-channels by the communication system to obtain an estimated channel response of each of the second portion of the pilot sub-channels; and
performing an interpolation on the estimated channel responses of the first and the second portions of the pilot sub-channels by the communication system to obtain an estimated channel response of each non-pilot sub-channel.

2. The method according to claim 1, wherein the first channel responses are stored in blocks of a memory and the blocks of the memory are updated by replacing the first channel response with the estimated channel responses of the pilot sub-channels.

3. The method according to claim 2, wherein each block of the memory has a size the same as that of the pilot symbols.

4. A method of channel estimation applied to a communication system having signals transmitted via a plurality of pilot and non-pilot sub-channels, the method comprising the steps of:
respectively receiving first and second pilot symbols by a receiver of the communication system during a first time duration and a second time duration and accordingly obtaining a first channel response and a second channel response of each pilot sub-channel during the first time duration and the second time duration;

averaging the first and the second channel responses of each sub-channel by the communication system to obtain a third channel response of each pilot sub-channel;

receiving third pilot symbols during a third time duration by the receiver and accordingly obtaining a fourth channel response of each pilot sub-channel during the third time duration;

averaging the third and the fourth channel responses of each pilot sub-channel by the communication system to obtain an estimated channel response of each pilot sub-channel; and performing an interpolation on the estimated channel responses of the pilot sub-channels by the communication system to obtain an estimated channel response of each non-pilot sub-channel.

5. The method according to claim 4, wherein the first channel responses are stored in blocks of a memory and the blocks of the memory are sequentially updated by replacing the first channel response with the third channel responses and replacing the third channel responses with the estimated channel responses of the pilot sub-channels.

6. The method according to claim 5, wherein each block of the memory has a size the same as that of the pilot symbols.

* * * * *